United States Patent [19]

Patarin

[11] Patent Number: 5,528,231
[45] Date of Patent: Jun. 18, 1996

[54] METHOD FOR THE AUTHENTICATION OF A PORTABLE OBJECT BY AN OFFLINE TERMINAL, AND APPARATUS FOR IMPLEMENTING THE PROCESS

[75] Inventor: Jacques Patarin, Viroflay, France

[73] Assignee: Bull CP8, Louveciennes, France

[21] Appl. No.: 254,955

[22] Filed: Jun. 7, 1994

[30] Foreign Application Priority Data

Jun. 8, 1993 [FR] France ................................. 93 06855

[51] Int. Cl.$^6$ ........................................................ G07D 7/00
[52] U.S. Cl. .................... 340/825.34; 340/825.31
[58] Field of Search .................... 340/825.34, 825.31; 380/23, 25; 235/380, 382, 382.5, 492

[56] References Cited

U.S. PATENT DOCUMENTS

| | | | |
|---|---|---|---|
| 4,283,599 | 8/1981 | Atalla | 340/825.34 |
| 4,630,201 | 12/1986 | White | 340/825.34 X |
| 4,719,566 | 1/1988 | Kelley | 340/825.34 X |
| 4,731,841 | 3/1988 | Rosen et al. | 380/23 |
| 4,779,090 | 10/1988 | Micznik et al. | 340/825.31 |
| 4,829,296 | 5/1989 | Clark et al. | 340/825.31 |
| 4,935,962 | 6/1990 | Austin | 380/25 |

FOREIGN PATENT DOCUMENTS

| | | |
|---|---|---|
| 0096599 | 12/1983 | European Pat. Off. . |
| 0231702 | 8/1987 | European Pat. Off. . |
| 0284133 | 9/1988 | European Pat. Off. . |

OTHER PUBLICATIONS

"Cryptographic Identification Methods for Smart Cards in the Process of Standardization", Hans–Peter Konigs, IEEE Communicatins Magazine, vol. 29, No. 6, Jun. 1991, Piscataway, N.J., pp. 42–48.

Primary Examiner—Brian Zimmerman
Assistant Examiner—Edwin C. Holloway, III
Attorney, Agent, or Firm—Weingarten, Schurgin, Gagnebin & Hayes

[57] ABSTRACT

A process for authentication by an offline terminal (1) of a portable object (2) including a processing circuit (4) able to deliver a secondary value (Rx) which the function of a primary value (Qi) transmitted by the terminal. An authentication table (5) is placed in the terminal which associates a series of primary values (Qi) and a series of control values (Ui), each control value being the transformation by a oneway function of the secondary value (Rx) calculated by the processing circuit of an authentic portable object. At the time of a connection of a portable object with the terminal, one of the primary values (Qi) from the table is transmitted to the portable object, the one-way function is applied to the secondary value (Rx) received from the portable object, and the result obtained is compared with the corresponding control value (Ui) from the table.

8 Claims, 2 Drawing Sheets

METHOD FOR THE AUTHENTICATION OF A PORTABLE OBJECT BY AN OFFLINE TERMINAL, AND APPARATUS FOR IMPLEMENTING THE PROCESS

BACKGROUND OF THE INVENTION

The invention concerns a process for the authentication, by an offline terminal, of a portable object, as well as the portable object and the terminal permitting the implementation of this process.

Understood by the term offline terminal is a terminal which is capable of authenticating a portable object without being connected to a central computer.

It is known that the delivery of goods and services by electronic means is experiencing an ever increasing growth. Access to the goods and services provided by a network is authorized by terminals connected to portable objects, generally memory cards supplied by an authorized entity. Before granting access to the goods or services, it is necessary that each terminal be able to authenticate the portable object to which it is connected in order to reject any portable object not supplied by the authorized entity.

One known authentication process consists of connecting each terminal to a central authentication server in order to perform an authentication online, the central authentication server being then protected to prohibit any access to intruders seeking authentication for objects not supplied by the authorized entity. Such a procedure is however very inconvenient due to the importance of the communication network which must remain in operation between the terminals and the central authentication server.

To minimize the cost of authentication, the terminals are often offline or stand-alone; a program and data are installed in each terminal permitting it to carry out the authentication.

Two procedures for authentication by an offline terminal are currently known. According to the first procedure, the terminal contains a secret code and makes use of an algorithm implementing this secret code. Terminals are however sometimes placed in locations where it is difficult to provide them with absolute protection against tampering, and the discovery of the secret code by an unauthorized party will give him the possibility of fabricating portable objects which will be authenticated by the other terminals containing the same secret code. It is thus necessary to install inconvenient means for the protection of the secret code.

According to a second known process, the offline terminals contain an accessible code, but it is then necessary to install an encryption algorithm in the portable objects which makes use of modular multiplication, requiring the installation of processing circuits on the portable object which are generally too expensive.

A goal of the present invention is to propose a process able to be implemented by an offline terminal containing nothing secret, and without the need for the execution of modular multiplications by the processing circuit of the portable object.

SUMMARY OF THE INVENTION

To achieve this goal, the invention proposes a method for the authentication, by an offline terminal, of a portable object comprising a processing circuit able to deliver a secondary value which is a function of a primary value transmitted by the terminal, characterized by the fact that an authentication table is installed in the terminal which associates a series of primary values and a series of secondary values with respective control values, each control value being the transformation by a one-way function within the terminal of the secondary value calculated by the processing circuit of an authentic portable object, and by the fact that, at the time of the connection of a portable object with the terminal, one of the primary values from the authentication table is transmitted to the portable object and the one-way function within the terminal is applied to the secondary value received from the portable object, the result obtained being compared to the corresponding control value from the table.

Thus, it is not possible for an intruder with access to the table to determine, from the control values, the secondary values which must be supplied by the portable object in order that the transformations of these secondary values by the one-way function be equal to the control values from the table.

The invention also concerns a portable object and a terminal able to implement the process indicated above.

The portable object per the invention comprises a memory not accessible by being read from the exterior and containing a secret authentication code (K) and a processing circuit, which is characterized by the fact that the latter utilizes a symmetric encryption algorithm to yield a secondary value (Ri) which is a function of the secret code (K) and of a primary value (Qi) transmitted to the object by the terminal in which the object is introduced.

As for the terminal of the invention, it comprises a series of primary values (Qi) and a series of control values (Ui), a device able to apply a one-way function (f) to a secondary value (Ri) received during the authentication of a portable object connected to the terminal, and a comparator for comparing the result obtained to the corresponding control value from the table.

BRIEF DESCRIPTION OF THE DRAWINGS

Further characteristics and advantages of the invention shall become apparent on reading the description which follows of various versions of the invented process, in relation to the enclosed drawings among which.

DETAILED DESCRIPTION

Figure 1:
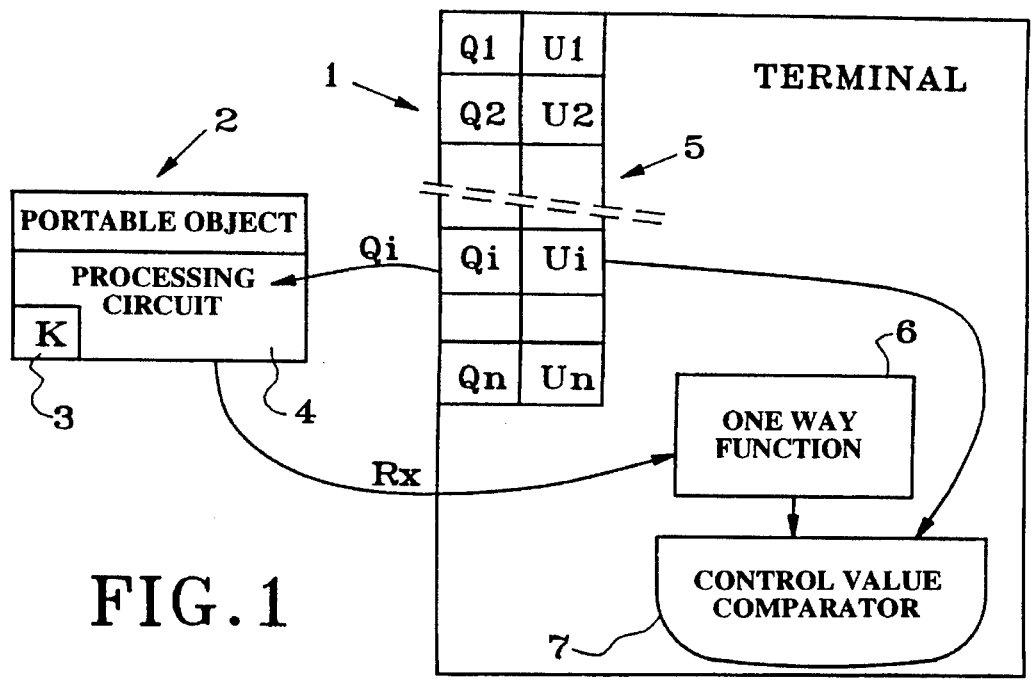
FIG. 1 illustrates schematically a first version of the invented process.

In FIG. 1, the invented process is designed to permit the authentication by an offline terminal, designated as a whole with 1, of a portable object designated as a whole with 2, comprising a memory 3 not accessible to exterior reading of the portable object, and containing a secret authentication code K, and a processing circuit 4 utilizing a symmetric encryption algorithm in an obvious manner, and more generally an algorithm of concealment, to deliver a secondary value Ri which is a function of the secret code K and of a primary value Qi transmitted by the terminal. In a first execution variant of the invention, the secret code K is the same for all the portable objects able to be connected to the terminal.

In the presentation which follows, the primary value Qi shall be designated by the term "question", the secondary value Ri by the term "response".

As a nonlimitative example, the symmetric encryption algorithm is, for example, the algorithm known under the name DATA ENCRYPTION STANDARD, abbreviated DES, so that the response to a question Qi is given by the formula $Ri=DES_K(Qi)$.

Installed in the terminal 1 is moreover a table 5 comprising a series of questions Q1, Q2 . . . Qi . . . Qn, and control values U1, U2 . . . Ui . . . Un, which are transformations by a one-way function of the responses R1, R2 . . . Ri . . . Rn, calculated by the processing circuit of an authentic portable object. Thus, $Ui=f(Ri)$. The one-way function f is, for example, the elevation to the square modulo m where m is a product of two large prime numbers which are not disclosed. For the question Qi, the control value is therefore:

$Ui=(Ri)^2 \text{modulo } m.$

It will be recalled in this regard that a one-way function is a function which can be calculated in one direction without special information, but which cannot be calculated in the inverse direction. In the example described, it is in fact possible to calculate $(Ri)^2$ modulo m once Ri is known, but it is not possible to determine Ri by knowing only Ui.

In the method of the present invention, the control values are calculated by the authorized entity via successive application of the one-way function to different responses given by an authentic portable object to different questions provided in order to be included in the table, the aggregate of the questions and control values then being loaded into the table of the terminal. Each terminal can have questions Q1 . . . Qn which are characteristic of it.

Moreover, the terminal 1 comprises a processing circuit 6 which applies the same one-way function to the response Rx given by the portable object to be authenticated when it is connected to the terminal and a question Qi sent to it. The terminal 1 likewise comprises a comparator 7 which compares the control value Ui corresponding to the question Qi from the table with the transformation by the one-way function of the response Rx given by the portable object in response to the question Qi sent to it.

If the portable object is authentic, the response Rx is equal to Ri and its transformation by the one-way function thus equal to Ui. The terminal then gives access to the operations provided in conjunction with the portable object under consideration. If the portable object is on the contrary not authentic, the response Rx is different from Ri, so that the transformation by the one-way function is different from the control value Ui, the portable object is rejected. It will be noted in this regard that access to the table 5 can be public and that it would be illusory to include a table containing the responses R1, R2 . . . Rn in the terminal, because it would then be possible for an intruder to create a portable object containing neither the code K nor the symmetric processing circuit, but merely a table identical to table 5 in order to transmit the response Ri to the terminal during transmission by the same of a question Qi. It will also be noted that it is not possible for an intruder with access to the table 5 to discover the value of the response Ri since the determination of such a response would presuppose that it is possible to invert the function $Ui=f(Ri)$. Let it be noted in this regard that the oneway function f can be a function which is totally unidirectional, that is to say, that there actually exists no calculable function which is the inverse of the function f, or, as in the case of the example described where f is an elevation to the square modulo m, a function which can be inverted if certain parameters are known, but not so treated in practice, because these parameters are not contained in the terminal.

Figure 2:
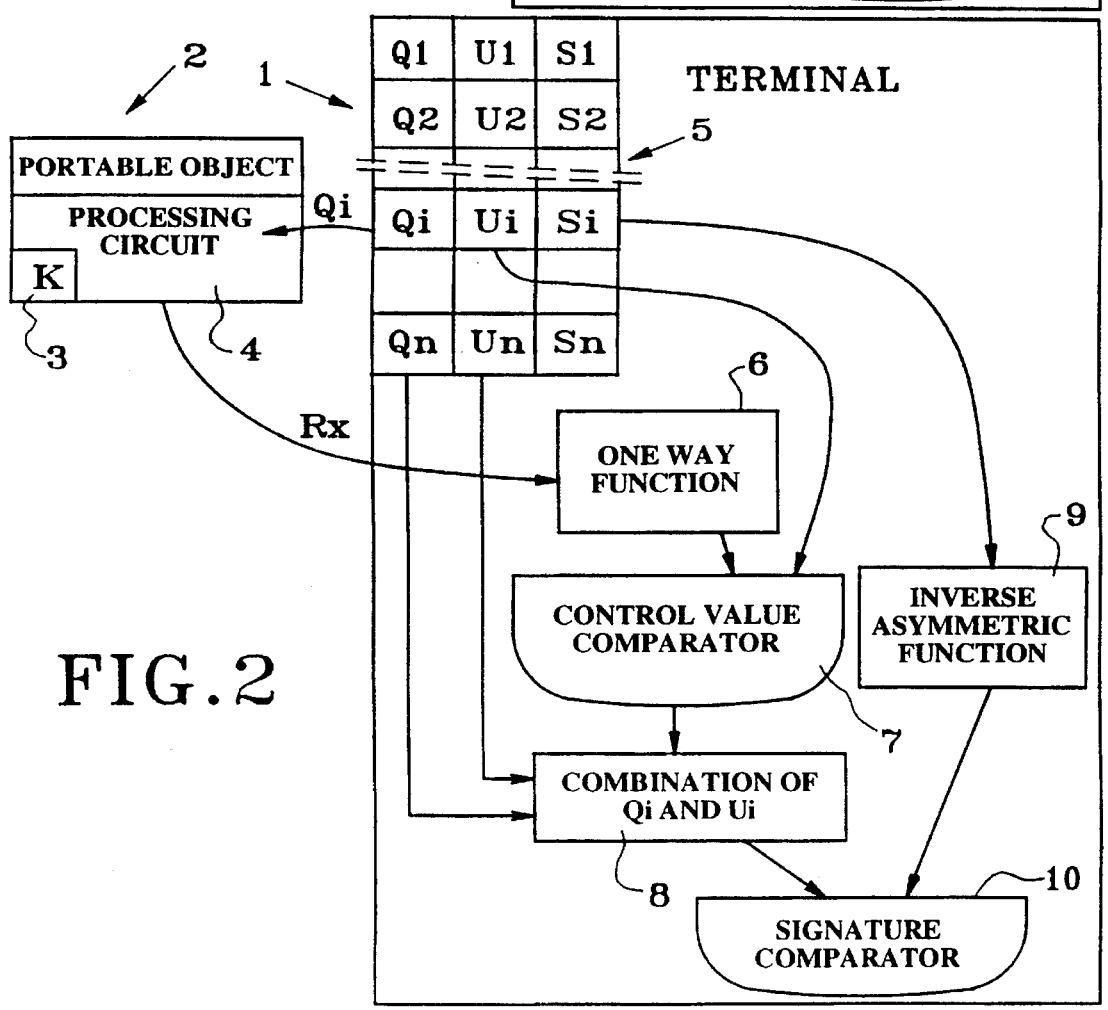
FIG. 2 illustrates schematically a more sophisticated version of the process shown in FIG. 1.

Due to the accessible character of terminal 1, the simplest version of the invented method does not ensure complete security with regard to a person capable not only of consulting table 5, but also of modifying it without being detected. It would be in fact possible for such a person to produce a false portable object comprising some algorithm transmitting responses to questions sent by the terminal and to modify the control values of table 5 of the terminal in order that these control values be the result of the application of the one-way function to the responses provided by the false portable object. The result of the comparison by the comparator 7 will in fact, in this case, be considered satisfactory, and access would thus be granted to the operations controlled by the terminal. To avoid this deception, there is a more sophisticated version of the invented method which is illustrated in FIG. 2.

In the second version of the invention, the terminal contains a table 5 comprising not only, as above, a series of questions and a series of control values, but also a series of signatures S1, S2, . . . Si . . . Sn which are transformed by an asymmetric decryption function of a combination of the question and of the corresponding control value. A question Qi being for example a succession of 64 bits and the corresponding control value Ui for example a sequence of 128 bits, a combination of the question and the control value will be produced for example by doubling the sequence of the question and the control function according to the pattern QiUiQiUi, the asymmetric encryption then being applied to this combination by the authorized entity in order to determine the corresponding signature Si to be included in the authentication table 5. The asymmetric encryption function is for example the square root modulo m of the combination thus produced. This square root modulo m can be determined only by having knowledge of the parameters which are not in any way included in the terminal.

During the authentication of a card, the method described relative to the simplified version of the method of the invention is applied on the one hand, and then, if the response is satisfactory, the combination cited above QiUiQiUi is effected in the terminal by means of a processing circuit 8 and, by means of a processing circuit 9, the inverse function of the asymmetric encryption function utilized by the authorized entity to determine the value of the signature Si is then likewise applied to the signature Si, the combination effected by the processing circuit 8 and the transformation of the signature Si by the processing circuit 9 being then compared in a comparator 10. It will be noted that this inverse asymmetric function, that is to say, the elevation to the square modulo m in the example described, does not require knowledge of the parameters which were necessary for direct application of the asymmetric encryption function. The realization of this inverse function by the terminal, which can be understood by an intruder, does not thus permit him to determine the signature which must be introduced at the same time as a control value in order that this signature coincide with the control value. In particular, if as it was envisaged above, the intruder creates a false card and falsifies the corresponding control values in order that the first comparison be satisfactory, it will not be possible for him to determine the signatures which must be associated with control values to make the second comparison equally satisfactory. The security of the method is thus improved relative to the simpler version of the invention.

It would be equally possible for an informed interloper not to modify table 5 of the terminal but to obtain provisionally an authentic card, to transmit successively all the questions from the table and to record, as they are passed, the responses Ri transmitted by the portable object to the terminal prior to the application of the one-way function. Being supplied with all the responses, it is then possible for the intruder to produce a false portable object containing a table merely associating the responses Ri with the questions Qi and thus transmitting a response Ri to the terminal each time a question Qi is sent by the terminal. To combat this deception, two solutions are provided according to the invention.

According to a first solution which can be utilized when the table contains a very large number of questions relative to the number of portable objects which may be connected to the terminal, a complete line of the table is erased after the corresponding question has been transmitted once to a portable object. The intruder who intercepts the responses to the questions will thus not be able to utilize them, since an identical question will not be transmitted again. It will be noted in this regard that the terminal is preferably regularly connected in a timely manner to the central unit of the authorized entity by a teletransmission line in order to reload or modify the table 5. If a terminal receives requests for access very frequently, it is possible to provide a table 5 containing thousands of lines.

Figure 3:
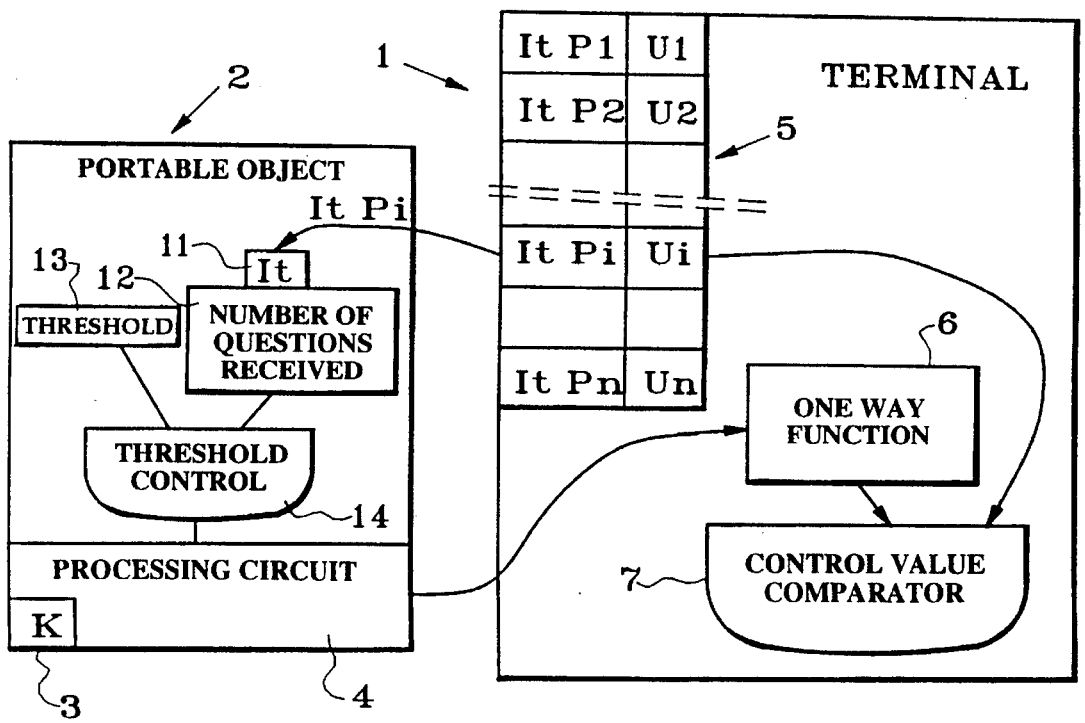
FIG. 3 is a schematic illustration of an advantageous aspect of the invention relative to a version of the invented process identical to that presented in FIG. 1.

According to a second solution which is illustrated in FIG. 3, an identifier It of the table is included for each question in the table. For example, when the questions are constituted by a train of 64 bits, provision is made that the first ten bits of each question shall be identical and shall constitute the identifier of the table. Each question Qi will thus have the form ItPi where only Pi varies from one question to another. Each terminal in the network thus contains a table having an identifier different from that of another terminal. Moreover, recorded in a memory 11 of the portable object is the identifier of each table or of the last ten tables or of the ten tables transmitting questions to it most frequently during its connection to a terminal, a counter 12 being associated with each identifier in memory which is incremented each time a question containing the memorized identifier is transmitted to the portable object. Furthermore, a threshold is recorded in a memory 13 of the portable object, and the value of the counter 12 is compared to the threshold by a comparator 14 each time a question is transmitted to the processing circuit 4. When the counter reaches the threshold recorded in memory, the processing circuit 4 of the portable object is blocked so that the portable object will not respond further to the questions of the corresponding terminal. An intruder is thus prevented from obtaining the responses to all the questions from the table and, due to the aleatory character of the questions transmitted by the terminal, the risk of a false card being authenticated by the terminal is minimized. In this case, the size of the table can be smaller than in the preceding example; for example, it is possible to set up a one hundred line table with a ten question threshold. In the latter situation, it is preferable that provision be made to replace the table, including its identifier, rather frequently.

Figure 4:
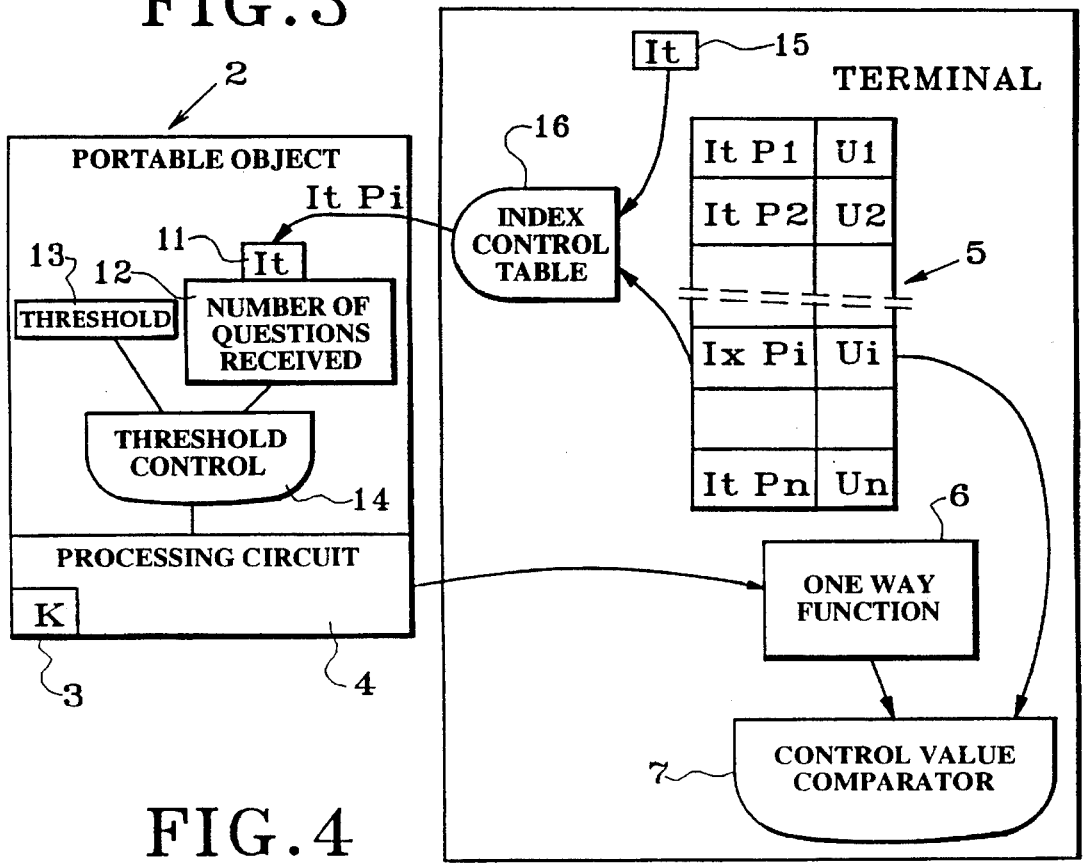
FIG. 4 illustrates schematically a variant for the implementation of the process shown in FIG. 3.

To prevent the critical threshold from being reached, causing blockage of the circuits of the portable object, an informed intruder could create a new table by mixing several tables containing different identifiers, taking each time in each of them a number of lines below the threshold in order to obtain all the responses to the questions of the new table thus constituted. According to a variant of this aspect of the invention, which is illustrated in FIG. 4, provision is made to memorize the table identifier not only in each of the questions, but also in a memory 15 of the table, and before transmission of a question to the portable object it is assured that the identifier of the table which it contains corresponds effectively to the table under consideration by comparing the part Ix of the question to the identifier It of the table by means of a comparator 16. If an anomaly is detected, the terminal is shut down and an alarm is contingently sent to the authorized entity in order that verification be carried out.

To avoid a saturation of the memory of the portable object, provision is made preferably to reset the counters of the portable objects to zero whenever a table is modified. For that purpose, the tables of the various terminals are for example modified on fixed dates and the date on which the counters were reset to zero recorded in memory. Thus, each time a portable object is connected to a terminal, it is possible to verify whether the date of the last reset to zero was before the last modification of the table and, in this case, to reset the counters of the portable object to zero by eliminating the corresponding identifiers.

According to another execution variant, it is possible to make provision for terminals equipped with several different tables in order to permit an authentication of portable objects containing different secret codes, each table being associated with a secret code. Each portable object will then contain a means for identifying the table before it is used for its authentication, so that the described process will unfold correctly. At the time of connection, the portable object will transmit to the terminal this means for identification of the table associated with its secret code, the subsequent authentication operations being then in conformity with the procedure per the invention described above.

Although the aspect of the invention relative to the utilization of a table identifier is described relative to the basic version of the invented process, this feature can likewise be employed with the sophisticated version making use of several tables.

The invention is not of course restricted to the various versions described, variations in it being possible without passing beyond the scope of the invention as-defined by the claims.

I claim:

1. A method for authenticating a portable object of a series of portable objects by an offline terminal, said portable object storing a secret code (K) and said terminal storing a one-way function, said method comprising the steps of:

providing the terminal with an authentication table which associates a series of primary values (Qi) and a series of control values (Ui), by processing each primary value (Qi) in processing circuits of an authentic portable object with the secret code (K) thereof for deriving a secondary value (Ri), and processing said secondary value (Ri) by said one-way function in processing circuits of an authorized entity to derive said control value (Ui);

connecting the portable object to be authenticated with the offline terminal;

transmitting one of the primary values (Qi) to the portable object from the terminal;

processing said one primary value (Qi) in processing circuits of said portable object with the secret code (K) thereof for deriving a secondary value (Rx);

transmitting the secondary value (Rx) to the terminal from the portable object;

applying within the terminal said one-way function to the secondary value (Rx) received from the portable object to derive a function result; and comparing, in the offline terminal, the function result to a control value (Ui) corresponding, in said authentication table, to said one primary value (Qi).

2. The method according to claim 1, the step of providing the terminal with an authentication table further including the steps of:

forming a first combination of a primary value (Qi) and a corresponding control value (Ui);

encrypting by an asymmetric function the first unique combination to form a corresponding signature value (Si); and storing the corresponding signature value (Si) within the authentication table (5), and the step of comparing the function result further including the steps of:

decrypting the corresponding signature value (Si) by applying an inverse of the asymmetric function to the corresponding signature value (Si) to form a decrypted signature value;

combining said one primary value (Qi) with the corresponding control value (Ui) of the authentication table to form a second combination; and comparing the decrypted signature value with the second combination.

3. The method according to claim 1, further including the step of eliminating each primary value from the table after the primary value has been transmitted once to a portable object.

4. The method of claim 1, wherein plural secret codes (K) are each distributed in respective ones in said series of portable objects, said step of providing the terminal with an authentication table comprises providing several tables, each storing those control values (Ui) which are based on a common secret code (K), and said step of transmitting one of the primary values (Qi) to the portable object comprises:

transmitting from a first portable object to the terminal means for identifying a first table associated with a first secret code of the first portable object;

transmitting one of the primary values (Qi) of said identified first table to the first portable object from the terminal.

5. The method according to claim 1, wherein the step of transmitting one of the primary values further includes the steps of:

including with each primary value of the table a table identifier (It);

recording in memory of the portable object the table identifier indicating the table from which the primary value has been transmitted;

counting with a counter (12) within the portable object and associated with each memorized table identifier each time a primary value is transmitted to the portable object from the table; and blocking transmission of a secondary value upon receipt of a primary value causing the counter associated with an identifier to reach a memorized threshold.

6. The method according to claim 5, wherein the step of counting further includes the step of resetting the counter within each portable object which corresponds to a modified table within the terminal to zero.

7. The method according to claim 5, wherein before the step of transmitting a primary value to the portable object includes verifying that the table identifier which the primary value contains corresponds to the table in which the primary value to be transmitted is stored.

8. A terminal for authenticating a portable object of a series of portable objects in an offline mode, comprising:

an authentication table which associates a series of primary values (Qi) and a series of control values (Ui), the control values (Ui) having been derived by processing each primary value (Qi) in processing circuits of an authentic portable object with a secret code (K) thereof for deriving a secondary value (Ri), and which processes said secondary value (Ri) by said one-way function in processing circuits of an authorized entity to derive said control value (Ui);

a processing circuit for applying said one-way function to a secondary value (Rx) received from the authentic portable object following transmission to the latter of one of the primary values (Qi), to derive a function result; and a comparator in communication with said table and said processing circuit for comparing the function result to a control value (Ui) corresponding, in said authentication table, to said one primary value (Qi).

* * * * *

UNITED STATES PATENT AND TRADEMARK OFFICE
CERTIFICATE OF CORRECTION

PATENT NO.   : 5,528,231
DATED        : June 18, 1996
INVENTOR(S)  : Jacques Patarin It is certified that error appears in the above-indentified patent and that said Letters Patent is hereby corrected as shown below:

Column 3, line 66, "oneway" should read --one-way--.

Signed and Sealed this

Twenty-fourth Day of March, 1998

Attest:

BRUCE LEHMAN

*Attesting Officer*                     *Commissioner of Patents and Trademarks*